(12) United States Patent
Noguchi et al.

(10) Patent No.: US 10,243,234 B2
(45) Date of Patent: Mar. 26, 2019

(54) SECONDARY BATTERY

(71) Applicant: NEC Corporation, Tokyo (JP)

(72) Inventors: Takehiro Noguchi, Tokyo (JP); Yuukou Katou, Tokyo (JP); Makiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/521,276

(22) PCT Filed: Oct. 21, 2015

(86) PCT No.: PCT/JP2015/079681
§ 371 (c)(1),
(2) Date: Apr. 21, 2017

(87) PCT Pub. No.: WO2016/063902
PCT Pub. Date: Apr. 28, 2016

(65) Prior Publication Data
US 2017/0352908 A1    Dec. 7, 2017

(30) Foreign Application Priority Data

Oct. 24, 2014  (JP) ................................. 2014-217828

(51) Int. Cl.
| | | |
|---|---|---|
| *H01M 10/0525* | (2010.01) | |
| *H01M 10/0569* | (2010.01) | |
| *H01M 4/38* | (2006.01) | |
| *H01M 4/40* | (2006.01) | |
| *H01M 10/052* | (2010.01) | |
| *H01M 4/42* | (2006.01) | |
| *H01M 4/46* | (2006.01) | |
| *H01M 4/48* | (2010.01) | |
| *H01M 4/58* | (2010.01) | |
| *H01M 10/058* | (2010.01) | |
| *H01M 4/485* | (2010.01) | |
| *H01M 10/04* | (2006.01) | |

(52) U.S. Cl.
CPC ........... *H01M 10/052* (2013.01); *H01M 4/38* (2013.01); *H01M 4/386* (2013.01); *H01M 4/40* (2013.01); *H01M 4/42* (2013.01); *H01M 4/46* (2013.01); *H01M 4/48* (2013.01); *H01M 4/483* (2013.01); *H01M 4/485* (2013.01); *H01M 4/58* (2013.01); *H01M 10/058* (2013.01); *H01M 10/0525* (2013.01); *H01M 10/0569* (2013.01); *H01M 10/04* (2013.01); *H01M 2300/0034* (2013.01); *H01M 2300/0037* (2013.01)

(58) Field of Classification Search
CPC .......... H01M 4/38; H01M 4/386; H01M 4/40; H01M 4/42; H01M 4/46; H01M 4/48; H01M 4/58; H01M 10/052; H01M 10/0525; H01M 10/0567; H01M 10/0568; H01M 10/0569; H01M 4/483; H01M 4/485; H01M 2300/0034; H01M 2300/0037
See application file for complete search history.

(56) References Cited

U.S. PATENT DOCUMENTS

| | | | |
|---|---|---|---|
| 9,905,887 B2* | 2/2018 | Takahashi | ......... H01M 10/0569 |
| 2013/0078530 A1 | 3/2013 | Kishi et al. | |
| 2013/0266847 A1 | 10/2013 | Noguchi et al. | |
| 2014/0017559 A1* | 1/2014 | Kawasaki | ............. H01M 4/364 |
| | | | 429/200 |
| 2014/0017560 A1 | 1/2014 | Sakata et al. | |
| 2014/0199602 A1 | 7/2014 | Kim et al. | |
| 2014/0227611 A1* | 8/2014 | Nakamura | ........ H01M 10/0525 |
| | | | 429/330 |
| 2015/0132663 A1 | 5/2015 | Noguchi et al. | |
| 2015/0140443 A1 | 5/2015 | Takahashi et al. | |
| 2015/0303521 A1 | 10/2015 | Sasaki et al. | |
| 2017/0170520 A1* | 6/2017 | Takahashi | ........... H01M 10/052 |

FOREIGN PATENT DOCUMENTS

| | | |
|---|---|---|
| CN | 1477729 A | 2/2004 |
| CN | 101714657 A | 5/2010 |
| CN | 102306838 A | 1/2012 |
| CN | 102403535 A | 4/2012 |
| CN | 102569885 A | 7/2012 |
| CN | 103250295 A | 8/2013 |
| CN | 103401020 A | 11/2013 |
| JP | 03-152879 | 6/1991 |
| JP | 2734978 B2 | 4/1998 |
| JP | 11-283669 A | 10/1999 |
| JP | 2000-021447 | 1/2000 |
| JP | 3291528 B2 | 6/2002 |

(Continued)

OTHER PUBLICATIONS

International Search Report and Written Opinion dated Jan. 19, 2016, in corresponding PCT International Application.
Non-final Office Action issued in co-pending U.S. Appl. No. 15/039,585, dated Feb. 27, 2018.
International Search Report and Written Opinion issued in the counterpart International Application PCT/JP2014/081117 (corresponding to co-pending U.S. Appl. No. 15/521,276), dated Jun. 9, 2016.

(Continued)

*Primary Examiner* — Anca Eoff

(74) *Attorney, Agent, or Firm* — Finnegan, Henderson, Farabow, Garrett & Dunner, L.L.P.

(57) ABSTRACT

An object of the present invention is to provide a secondary battery having high energy density with long-term life. The present invention relates to a secondary battery comprising a negative electrode comprising a silicon-containing compound and an electrolyte solution comprising a fluorine-containing ether compound, a fluorine-containing phosphoric acid ester, a sulfone compound and a cyclic carbonate compound in a predetermined amount respectively.

18 Claims, 2 Drawing Sheets

(56) References Cited

FOREIGN PATENT DOCUMENTS

| | | |
|---|---|---|
| JP | 3451781 B2 | 9/2003 |
| JP | 2007-287677 | 11/2007 |
| JP | 2010-146740 | 7/2010 |
| JP | 2011-023330 | 2/2011 |
| JP | 2014-137996 | 7/2014 |
| WO | WO 2008/133112 A1 | 11/2008 |
| WO | WO 2009/035085 A1 | 3/2009 |
| WO | WO 2010/090028 A1 | 8/2010 |
| WO | WO 2011/040443 A1 | 4/2011 |
| WO | WO 2011/040447 A1 | 4/2011 |
| WO | WO 2011/162169 A1 | 12/2011 |
| WO | WO 2012/133698 A1 | 4/2012 |
| WO | WO 2012/077712 A1 | 6/2012 |
| WO | WO 2012/132059 * | 10/2012 |
| WO | WO 2012/133902 A1 | 10/2012 |
| WO | WO 2013/042503 A1 | 3/2013 |
| WO | WO 2013/129428 A1 | 9/2013 |
| WO | WO 2013/183655 A1 | 12/2013 |
| WO | WO 2014/080871 A1 | 5/2014 |
| WO | WO 2014/181877 A1 | 11/2014 |

OTHER PUBLICATIONS

First Office Action dated Oct. 10. 2017, from the State Intellectual Property Office of the People's Republic of China in corresponding Chinese Patent Application No. 201480064980.
Final Office Action dated Sep. 14, 2018, in U.S. Appl. No. 15/039,585.
Office Action dated Jul. 19, 2018, by the State Intellectual Property Office of the People's Republic of China in a corresponding application No. 201480064980.X.

* cited by examiner

SECONDARY BATTERY

CROSS-REFERENCE TO RELATED PATENT APPLICATIONS

This application is a National Stage Entry of International Application No. PCT/JP2015/079681, filed Oct. 21, 2015, which claims priority from Japanese Patent Application No. 2014-217828, filed Oct. 24, 2014. The entire contents of the above-referenced applications are expressly incorporated herein by reference.

TECHNICAL FIELD

The present invention relates to a secondary battery and a method of manufacturing the same.

BACKGROUND ART

A lithium secondary battery is widely used for a portable electric device, a personal computer and the like, but there are requirements for further increases in energy density and prolonging battery life, and it has been a problem to balance them.

As a technique for increasing the energy density of a lithium secondary battery, silicon-based materials which are negative electrode active material having high capacity has been studied. However, there has been a problem that the silicon-based materials are inferior in life characteristics to conventional graphite-based materials.

As a cause of the deterioration of the lifetime characteristic of the silicon-based negative electrode material, it has been reported that cracks of active material particles occur due to expansion and contraction caused by insertion and desorption of Li associated with charge and discharge. In addition, there have been problems such as that gas is generated by reacting with the electrolyte solvent on the negative electrode active materials and capacity of the battery is reduced. Studies have been conducted whose objective is to reduce reactivity between silicon-based negative electrode materials and electrolyte solutions. For example, Patent Literature 1 describes an example in which a fluorinated ether is used as an electrolyte solvent in a secondary battery having a negative electrode containing silicon. Patent Literature 2 describes an example in which a fluorinated phosphoric acid ester is used as an electrolyte solvent in a secondary battery having a negative electrode containing silicon.

Further, for the purpose of improving the life characteristics of secondary batteries, combinations of compounds used for electrolyte solutions have been investigated. Patent Literature 3 describes an electrolyte solution containing a fluorine-containing open-chain ether and non-fluorine cyclic carbonate, and also describes that phosphoric acid esters may be blended for improvement of flame retardancy. Patent Literature 4 describes an electrolyte solution for a lithium ion secondary battery comprising a fluorine-containing ether, at least one fluorine-containing solvent selected from the group consisting of fluorine-containing cyclic carbonates and fluorine-containing lactones, and at least one non-fluorine carbonate selected from the group consisting of non-fluorine cyclic carbonates and non-fluorine open-chain carbonates.

Patent Literature 5 describes that, with respect to a lithium secondary battery having a positive electrode containing a positive electrode active material that operates at high potential of 4.5V or more versus lithium, a secondary battery having high energy density with improved cycle characteristics can be obtained by using an electrolyte solution containing a fluorine-containing phosphoric acid ester.

CITATION LIST

Patent Literature

Patent Literature 1: International Publication WO2011/040443

Patent Literature 2: International Publication WO2011/040447

Patent Literature 3: Japanese Patent Laid-Open No. 2010-146740

Patent Literature 4: International Publication WO2009/035085

Patent Literature 5: International Publication WO2012/077712

SUMMARY OF INVENTION

Technical Problem

However, the secondary batteries described in Patent Literature 1 and Patent Literature 2 have needed further improvement in applications requiring life characteristics, particularly long-term life characteristics. In addition, Patent Literatures 3, 4, and 5 do not describe the above-mentioned problems in case where a silicon-based compound is used as a negative electrode active material and means for solving the problems, and there has been room for further study about the improvement of the life characteristics of the secondary battery in the case where a silicon-based compound as a negative electrode active material is used.

An object of the present invention is to provide a secondary battery having high energy density with improved life characteristics, particularly improved long-term life characteristics under high temperature.

Solution to Problem

A secondary battery comprising a negative electrode and an electrolyte solution, wherein the negative electrode comprises a negative electrode active material comprising a silicon-containing compound, and wherein the electrolyte solution comprises:

at least one selected from fluorine-containing ether compounds represented by the following formula (1), at least one selected from fluorine-containing phosphoric acid ester compounds represented by the following formula (2), at least one selected from sulfone compounds represented by the following formula (3), and at least one selected from cyclic carbonate compounds, and wherein a content of the fluorine-containing ether compound represented by the formula (1) in the electrolyte solution is 10 vol % or more and 80 vol % or less, a content of the fluorine-containing phosphoric acid ester compound represented by the formula (2) in the electrolyte solution is 1 vol % or more and 50 vol % or less, a content of the sulfone compound represented by the formula (3) in the electrolyte solution is 1 vol % or more and 50 vol % or less, and a content of the cyclic carbonate compound in the electrolyte solution is 1 vol % or more and 40 vol % or less;

(1)

{In formula (1), $R_1$ and $R_2$ are each independently an alkyl group or a fluorine-containing alkyl group, and at least one of $R_1$ and $R_2$ is a fluorine-containing alkyl group.};

(2)

{In formula (2), $R_1'$, $R_2'$ and $R_3'$ are each independently an alkyl group or a fluorine-containing alkyl group, and at least one of $R_1'$, $R_2'$ and $R_3'$ is a fluorine-containing alkyl group.};

(3)

{In formula (3), $R_1''$ and $R_2''$ are each independently a substituted or unsubstituted alkyl group or alkylene group, and carbon atoms in $R_1''$ and $R_2''$ may be bonded through a single bond or a double bond to form a cyclic compound.}

Advantageous Effect of Invention

The present invention can provide a secondary battery having high energy density with high life characteristics.

DESCRIPTION OF EMBODIMENTS

Figure 1:
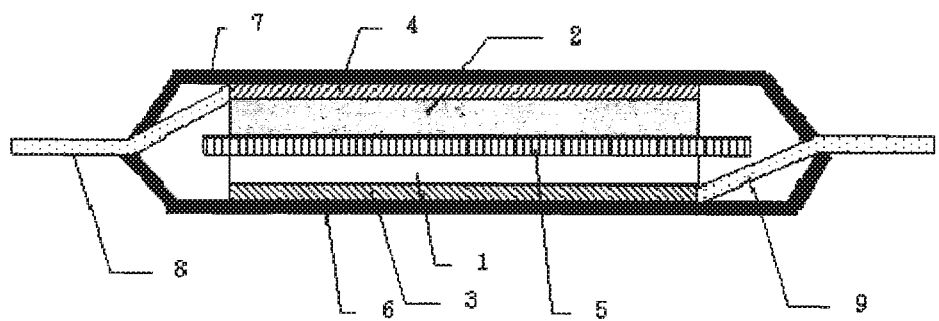
FIG. 1 is a cross-sectional view of a secondary battery according to one embodiment of the present invention.

The secondary battery of the present embodiment has a negative electrode and an electrolyte solution. The negative electrode comprises a negative active material comprising a silicon-containing compound. The electrolyte solution comprises at least one selected from the above fluorine-containing ether compounds represented by the above formula (1), at least one selected from a fluorine-containing phosphoric acid ester compounds represented by the above formula (2), at least one selected from sulfone compounds represented by the above formula (3) and at least one selected from the cyclic carbonate compounds. A content of the fluorine-containing ether compound represented by the formula (1) in the electrolyte solution is 10 vol % or more and 80 vol % or less, a content of the fluorine-containing phosphoric acid ester compound represented by the formula (2) in the electrolyte solution is 1 vol % or more and 50 vol % or less, a content of the sulfone compound represented by the formula (3) in the electrolyte solution is 1 vol % or more and 50 vol % or less, and a content of the cyclic carbonate compound in the electrolyte solution is 1 vol % or more and 40 vol % or less.

Preferred embodiments of the present invention will be described below.
(Electrolyte Solution)

The electrolyte solution of the secondary battery of the present embodiment comprises, as a non-aqueous solvent, at least one selected from the above fluorine-containing ether compounds represented by the formula (1), at least one selected from a fluorine-containing phosphoric acid ester compounds represented by the formula (2), at least one selected from sulfone compounds represented by the formula (3) and at least one selected from the cyclic carbonate compounds. The electrolyte solution preferably comprises a non-aqueous solvent containing the predetermined compounds and a supporting salt. In the present specification, the electrolyte solution is also referred to as a "non-aqueous electrolyte solution". Further, the fluorine-containing ether compound represented by the formula (1) is also referred to as a "fluorine-containing ether compound" or "fluorine-containing ether" simply, the fluorine-containing phosphoric acid ester compound represented by the formula (2) is also referred to as a "fluorine-containing phosphoric acid ester compound" or "fluorine-containing phosphoric acid ester" simply, and the sulfone compound represented by formula (3) is also referred to as a "sulfone compound" or "sulfone".

The electrolyte solution of the present embodiment can improve the life characteristics of the secondary battery using the same by containing the fluorine-containing ether compound represented by the following formula (1).

(1)

{In formula (1), $R_1$ and $R_2$ are each independently an alkyl group or a fluorine-containing alkyl group, and at least one of $R_1$ and $R_2$ is a fluorine-containing alkyl group.}

The number of carbon atoms of alkyl group and fluorine-containing alkyl group (i.e. $R_1$ and $R_2$) in the fluorine-containing ether compound represented by the formula (1) is each independently preferably 1 or more and 10 or less, and more preferably 1 or more and 8 or less. When the numbers of carbon atoms of alkyl group and fluorine-containing alkyl group are each 10 or less, increase in viscosity of the electrolyte solution is suppressed and the electrolyte solution is easily immersed into the pores of the electrode and the separator, and at the same time, ion conductivity is improved and the current value in charge and discharge characteristics of the battery is improved. The alkyl group and fluorine-containing alkyl group ($R_1$ and $R_2$) includes straight or branched open-chain.

The fluorine-containing ether compound represented by the formula (1) preferably has a carbon number (the total number of carbon atoms included in $R_1$ and $R_2$) of about 4 or more and 10 or less, from the viewpoint of boiling point and viscosity. 5 or more and 9 or less is more preferable.

In the present embodiment, in formula (1), as long as at least one of $R_1$ and $R_2$ is a fluorine-containing alkyl group, only one of them may be a fluorine-containing alkyl group, or both may be fluorine-containing alkyl groups. The fluorine-containing alkyl group is a group in which a part or all of hydrogens of the alkyl group is substituted with fluorine. By comprising fluorine, the oxidation resistance can be enhanced and cycle characteristics can be improved. When the content of fluorine atoms is large, voltage resistance can be improved and even in a high voltage battery or a battery operated at a high temperature for a long time, the decrease in capacity can be suppressed. On the other hand, when the content of fluorine (fluorine substitution ratio) is excessively large, reduction resistance may be lowered or compatibility with other solvents of the electrolyte solution may decrease. For this reason, the fluorine substitution ratio of the fluorine-containing ether compound contained in the non-aqueous electrolyte solution is preferably 20% or more and 100% or less, more preferably 30% or more and 95% or less, and further preferably 40% or more and 90% or less. In the present specification, the term "fluorine substitution ratio" refers to the ratio of the number of fluorine atoms based on the total number of hydrogen atoms and fluorine atoms in the fluorinated compound (fluorine-containing compound).

The content of the fluorine-containing ether compound represented by the general formula (1) contained in the non-aqueous electrolyte solution is 10 to 80 vol %. When the content is 10 vol % or more, the effect of increasing the voltage resistance is enhanced. When the content is 80 vol % or less, ion conductivity of the electrolyte solution is improved and thereby charge and discharge rate of the battery becomes excellent. The total content of the compound of the general formula (1) in the electrolyte solution is more preferably 20 to 75 vol %, and further preferably 30 to 70 vol %.

Examples of the fluorine-containing ether compound include 2,2,3,3,3-pentafluoropropyl 1,1,2,2-tetrafluoroethyl ether, 1,1,2,2-tetrafluoroethyl 2,2,2-trifluoroethyl ether, 1H, 1H, 2'H, 3H-decafluorodipropyl ether, 1,1,2,3,3,3-hexafluoropropyl 2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H, 1H, 5H-perfluoropentyl 1,1,2,2-tetrafluoroethyl ether, 1H-perfluorobutyl 1H-perfluoroethyl ether, methyl perfluoropentyl ether, methyl perfluorohexyl ether, methyl 1,1,3,3,3-pentafluoro-2-(trifluoromethyl)propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H, 1H, 5H-octafluoropentyl 1,1,2,2-tetrafluoroethyl ether, 1H, 1H, 2'H-perfluorodipropyl ether, heptafluoropropyl 1,2,2,2-tetrafluoroethyl ether, 1,1,2,2-tetrafluoroethyl 2,2,3,3-tetrafluoropropyl ether, 2,2,3,3,3-pentafluoropropyl 1,1,2,2-tetrafluoroethyl ether, ethyl nonafluorobutyl ether, methyl nonafluorobutyl ether, 1,1-difluoroethyl 2,2,3,3-tetrafluoropropyl ether, bis(2,2,3,3-tetrafluoropropyl) ether, 1,1-difluoroethyl 2,2,3,3,3-pentafluoropropyl ether, 1,1-difluoroethyl 1H, 1H-heptafluorobutyl ether, 2,2,3,4,4,4-hexafluorobutyl difluoromethyl ether, bis(2,2,3,3,3-pentafluoropropyl) ether, nonafluorobutyl methyl ether, bis(1H, 1H-heptafluorobutyl) ether, 1,1,2,3,3,3-hexafluoropropyl 1H, 1H-heptafluorobutyl ether, 1H, 1H-heptafluorobutyl trifluoromethyl ether, 2,2-difluoroethyl 1,1,2,2-tetrafluoroethyl ether, bis(trifluoroethyl) ether, bis(2,2-difluoroethyl) ether, bis(1,1,2-trifluoroethyl) ether, 1,1,2-trifluoroethyl 2,2,2-trifluoroethyl ether, bis(2,2,3,3-tetrafluoropropyl) ether and the like.

Among these, from the viewpoint of voltage resistance and boiling point, at least one selected from the group consisting of 1,1,2,2-tetrafluoroethyl 2,2,3,3-tetrafluoropropyl ether, 2,2,3,4,4,4-hexafluorobutyl difluoromethyl ether, 1,1-difluoroethyl 2,2,3,3-tetrafluoropropyl ether, 1,1,2,3,3,3-hexafluoropropyl 2,2-difluoroethyl ether, 1,1-difluoroethyl 1H, 1H-heptafluorobutyl ether, 1H, 1H, 2'H, 3H-decafluorodipropyl ether, bis(2,2,3,3,3-pentafluoropropyl)ether, 1H, 1H, 5H-perfluoropentyl 1,1,2,2-tetrafluoroethyl ether, bis (1H, 1H-heptafluorobutyl)ether, 1H, 1H, 2'H-perfluorodipropyl ether, 1,1,2,3,3,3-hexafluoropropyl 1H, 1H-heptafluorobutyl ether, 1H-perfluorobutyl 1H-perfluoroethyl ether, and bis(2,2,3,3-tetrafluoropropyl)ether is preferably comprised.

The fluorine-containing ether compound may be used singly or in combination of two or more types thereof. When two or more types of the fluorine-containing ether compounds are used in combination, the cycle characteristics of the secondary battery may be improved as compared with the case of using only one type in some cases.

The fluorine-containing ether compound may have a low compatibility with other solvents in some cases, but by adding a fluorine-containing phosphoric acid ester compound or a sulfone compound, the compatibility between the solvents is enhanced. Even if solvents having low compatibility can be uniformly mixed once, they may be separated by leaving it for a long period of time or rising or decreasing in temperature in some cases. However, the long-term stability of the electrolyte solution can be improved by mixing the fluorine-containing ether compound with the fluorine-containing phosphoric acid ester and the sulfone compound.

Among the fluorine-containing ether compounds, since compounds having a high fluorine substitution ratio, in particular, have low compatibility with other solvents, the effect of improving the uniformity of the electrolyte solution by mixing with the fluorine-containing phosphoric acid ester compound and the sulfone compound is high.

In the present embodiment, the non-aqueous electrolyte solution contains at least one selected from the fluorine-containing phosphoric acid ester compounds represented by the formula (2).

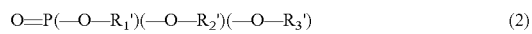

$$O=P(-O-R_1')(-O-R_2')(-O-R_3') \qquad (2)$$

{In formula (2), $R_1'$, $R_2'$ and $R_3'$ are each independently represent an alkyl group or a fluorine-containing alkyl group, and at least one of $R_1'$, $R_2'$ and $R_3'$ is a fluorine-containing alkyl group.}

In formula (2), the number of carbon atoms in the $R_1'$, $R_2'$ and $R_3'$ is each independently preferably 1 to 4.

In the present embodiment, the total number of carbon atoms in the fluorine-containing phosphoric acid ester (the total number of carbon atoms in $R_1'$, $R_2'$ and $R_3'$) is preferably 4 or more and 15 or less, more preferably 4 or more and 10 or less, and further preferably 5 or more and 9 or less.

Examples of the fluorine-containing phosphoric acid ester compound include 2,2,2-trifluoroethyl dimethyl phosphate, bis(trifluoroethyl)methyl phosphate, bistrifluoroethyl ethyl phosphate, tris(trifluoromethyl) phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, tris(2,2,3,3-tetrafluoropropyl) phosphate, tris(2,2,3,3,3-pentafluoropropyl) phosphate, tris (2,2,2-trifluoroethyl) phosphate (hereinafter abbreviated as PTTFE), tris(1H, 1H-heptafluorobutyl) phosphate, tris(1H, 1H, 5H-octafluoropentyl) phosphate and the like.

Among these, since the effect of suppressing decomposition of the electrolyte solution at high potential is high, it comprises preferably at least one selected from tris(2,2,2-trifluoroethyl) phosphate (PTTFE) represented by the following formula (9), tris(2,2,3,3,3-pentafluoropropyl) phosphate and tris(1H, 1H-heptafluorobutyl) phosphate, and more preferably tris(2,2,2-trifluoroethyl) phosphate.

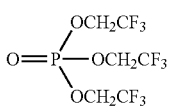

(9)

The fluorine-containing phosphoric acid ester compound may be used alone or in combination of two or more thereof. By containing two or more types of the fluorine-containing phosphoric acid ester compounds, a secondary battery having high life characteristics may be obtained in some cases.

The fluorine-containing phosphoric acid ester has advantages that oxidation resistance is high and it is hardly decomposed. In addition, it is considered that it has also the effect of suppressing gas generation. On the other hand, since viscosity is high and the dielectric constant is comparatively low, when the content is excessively large, there is a problem that conductivity of the electrolyte solution decreases. For this reason, the content of the fluorine-containing phosphoric acid ester in the non-aqueous electrolyte solution is preferably 1 to 50 vol %, more preferably 5 to 40 vol % and further preferably 10 to 30 vol %. When the electrolyte solution comprises 5 vol % or more of the fluorine-containing phosphoric acid ester, compatibility between the fluorine-containing ether compound and other solvents can be enhanced.

In the present embodiment, the non-aqueous electrolyte solution contains at least one selected from sulfone compounds represented by the following general formula (3).

{In formula (3), $R_1''$ and $R_2''$ each independently represent a substituted or unsubstituted alkyl group or alkylene group, and carbon atoms in $R_1''$ and $R_2''$ may be bonded through a single bond or a double bond to form a cyclic compound.}

In formula (3), the number of carbons $n_1$ in $R_1''$ and the number of carbons $n_2$ in $R_2''$ are each independently preferably $1 \leq n_1 \leq 12$ and $1 \leq n_2 \leq 12$, more preferably $1 \leq n_1 \leq 6$ and $1 \leq n_2 \leq 6$, and further preferably $1 \leq n_1 \leq 3$ and $1 \leq n_2 \leq 3$. The alkyl group also includes open-chain, branched-chain, and cyclic ones.

$R_1''$ and $R_2''$ may have a substituent, and examples of the substituent include alkyl groups having 1 to 6 carbon atoms (for example, methyl group, ethyl group, propyl group, isopropyl group, butyl group, and isobutyl group), aryl groups having 6 to 10 carbon atoms (for example, phenyl group and naphthyl group), halogen atoms (for example, a chlorine atom, bromine atom, and fluorine atom) and the like.

Alternatively, the sulfone compound is preferably a cyclic sulfone compound represented by the following Formula (5):

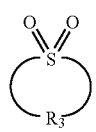

(5)

(In formula (5), $R_3$ represents substituted or unsubstituted alkylene group.)

In formula (5), the number of carbon atoms is preferably 4 to 9, more preferably 4 to 6.

$R_3$ may have a substituent, and examples of the substituent include alkyl groups having 1 to 6 carbon atoms (for example, methyl group, ethyl group, propyl group, isopropyl group, and butyl group), halogen atoms (for example, chlorine atom, bromine atom, and fluorine atom) and the like.

Examples of the sulfone compound include cyclic sulfones including sulfolane (i.e. tetramethylene sulfone), methylsulfolanes such as 3-methylsulfolane, 3,4-dimethylsulfolane, 2,4-dimethylsulfolane, trimethylene sulfone (thietane 1,1-dioxide), 1-methyl trimethylene sulfone, pentamethylene sulfone, hexamethylene sulfone and ethylene sulfone; and open-chain sulfones including dimethyl sulfone, ethyl methyl sulfone, diethyl sulfone, butyl methyl sulfone, dibutyl sulfone, methyl isopropyl sulfone, diisopropyl sulfone, methyl tert-butyl sulfone, butyl ethyl sulfone, butyl propyl sulfone, butyl isopropyl sulfone, di-tert-butyl sulfone, diisobutyl sulfone, ethyl isopropyl sulfone, ethyl isobutyl sulfone, tert-butyl ethyl sulfone, propyl ethyl sulfone, isobutyl isopropyl sulfone, butyl isobutyl sulfone and isopropyl (1-methyl-propyl) sulfone. Among these, at least one selected from sulfolane, 3-methyl sulfolane, dimethyl sulfone, ethyl methyl sulfone, diethyl sulfone and ethyl isopropyl sulfone is preferable.

These sulfone compounds may be used singly or in combination of two or more thereof. As one aspect of the present embodiment, it is preferable to use in combination of a cyclic sulfone and an open-chain sulfone, and it is more preferable that the volume ratio of an open-chain sulfone to the total of the volume of the cyclic sulfone and the open-chain sulfone is 10% or more and 90% or less.

The sulfone compounds have a characteristic that the dielectric constant is comparatively high, facilitate dissociation of the electrolyte supporting salt and has the effect of increasing electrical conductivity of the electrolyte solution. Also, it has characteristics that oxidation resistance is high and gas is less generated even at a high temperature operation. In addition, in a secondary battery having a silicon-based negative electrode, although there is a problem of decomposition of the electrolyte solution at the interface between the negative electrode and the electrolyte solution, adding a sulfone-based material exhibits the effect of forming a film so as to suppress the reaction between a fluorinated ether compound or a fluorinated phosphoric acid ester compound and the silicon-based negative electrode. On the other hand, since a sulfone compound has high viscosity, if the concentration thereof is excessively high, it is a problem that ion conductivity conversely decreases. For this reason, the content of the sulfone compound in the non-aqueous electrolyte solution is preferably 1 to 50 vol %, more preferably 2 to 40 vol %, and further preferably 5 to 30 vol %. When the sulfone compound in the electrolyte solution is contained in an amount of 5 vol % or more, compatibility between the fluorine-containing ether compound and other solvents can be enhanced.

The non-aqueous electrolyte solution further comprises a cyclic carbonate (including fluoride).

Examples of the cyclic carbonate, but are not particularly limited to, include ethylene carbonate (EC), propylene carbonate (PC), butylene carbonate (BC), or vinylene carbonate (VC) and the like. Examples of the fluorinated cyclic carbonate include compounds in which a part or all of the hydrogen atoms in ethylene carbonate (EC), propylene carbonate (PC), butylene carbonate (BC), vinylene carbonate (VC) and the like are substituted with fluorine atoms. More specifically, for example, 4-fluoro-1,3-dioxolan-2-one (monofluoroethylene carbonate), (cis or trans)4,5-difluoro-1,3-dioxolan-2-one, 4,4-difluoro-1,3-dioxolan-2-one, 4-fluoro-5-methyl-1,3-dioxolan-2-one and the like may be used. Among the cyclic carbonates listed above, ethylene carbonate, propylene carbonate, 4-fluoro-1,3-dioxolan-2-one and the like are preferable from the viewpoint of voltage resistance and electrical conductivity. The cyclic carbonates may be used singly or in combination of two or more thereof.

Fluorinated ether has low compatibility with other electrolyte solutions, and when the concentration is excessively high, it may be difficult to obtain a uniform electrolyte solution in some cases. However, among the cyclic carbonates, particularly when propylene carbonate is used, solubility increases, and thus it is preferable to comprise propylene carbonate. It is preferable to comprise 20 vol % or more and 80 vol % or less of propylene carbonate in the total cyclic carbonate compounds in some cases. In one aspect of the present embodiment, the electrolyte solution preferably comprises at least one selected from propylene carbonate, ethylene carbonate and fluorinated ethylene carbonate, and among these, it is more preferable that propylene carbonate is contained in an amount of 20 vol % or more and 80 vol % in the total cyclic carbonate compounds.

Since the cyclic carbonate has a large relative dielectric constant, when the electrolyte solution comprises the cyclic carbonate, the dissolution of the supporting salt is enhanced and sufficient electrical conductivity can be easily imparted. When the electrolyte solution comprises a cyclic carbonate, it has the advantage that the ion mobility in the electrolyte solution is enhanced. However, under high voltage or high temperature, the amount of gas generated tends to increase compared to a fluorinated ether, fluorinated phosphoric acid ester and a sulfone-based material. On the other hand, it has the effect of improving a life characteristic due to the film formation on the negative electrode. Thus, from the viewpoint of the effect of increasing dissociation degree of the supporting salt and the effect of increasing the electrical conductivity, the content of the cyclic carbonate in the non-aqueous electrolyte solution is preferably 1 to 40 vol %, more preferably 2 to 30 vol % and further preferably 5 to 25 vol %.

The non-aqueous electrolyte solution may further comprise open-chain carbonates (including fluoride), open-chain carboxylic acid esters (including fluoride), cyclic carboxylic acid esters (including fluoride), cyclic ethers (including fluoride), phosphoric acid esters and the like.

Examples of the open-chain carbonate include, but are not particularly limited to, dimethyl carbonate (DMC), ethylmethyl carbonate (EMC), diethyl carbonate (DEC), and dipropyl carbonate (DPC) and the like. The open-chain carbonate also includes a fluorinated open-chain carbonate. Examples of the fluorinated open-chain carbonate include compounds in which a part or all of hydrogen atoms in ethylmethyl carbonate (EMC), dimethyl carbonate (DMC), diethyl carbonate (DEC), dipropyl carbonate (DPC) and the like are substituted with fluorine atoms. As the open-chain fluorinated carbonate, more specifically, bis(fluoroethyl) carbonate, 3-fluoropropyl methyl carbonate, 3,3,3-trifluoropropyl methyl carbonate and the like may be exemplified. Among these, dimethyl carbonate is preferred from the viewpoint of voltage resistance and electrical conductivity. The open-chain carbonates may be used singly or in combination of two or more thereof.

The open-chain carbonate has the effect of reducing the viscosity of the electrolyte solution, and thus, it can increase electrical conductivity of the electrolyte solution.

Examples of the carboxylic acid ester include, but are not limited to, ethyl acetate, methyl propionate, ethyl formate, ethyl propionate, methyl butyrate, ethyl butyrate, methyl acetate, and methyl formate. The carboxylic acid ester also includes a fluorinated carboxylic acid ester, and examples of the fluorinated carboxylic acid ester include compounds in which a part or all of hydrogen atoms of ethyl acetate, methyl propionate, ethyl formate, ethyl propionate, methyl butyrate, ethyl butyrate, methyl acetate, or methyl formate are substituted with fluorine atoms. Specific examples thereof include ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl) butyrate, methyl tetrafluoro-2-(methoxy)propionate, 3,3, 3trifluoropropyl 3,3,3-trifluoropropionate, methyl difluoroacetate, 2,2,3,3-tetrafluoropropyl trifluoroacetate, 1H, 1H-heptafluorobutyl acetate, methyl heptafluorobutyrate, and ethyl trifluoroacetate. Among these, from the viewpoint of voltage resistance, the boiling point and the like, ethyl propionate, methyl acetate, methyl 2,2,3,3-tetrafluoropropionate, 2,2,3,3-tetrafluoropropyl trifluoroacetate and the like are preferable. The carboxylic acid ester is effective in reducing the viscosity of the electrolyte solution as the open-chain carbonate and the open-chain ether. Therefore, for example, the carboxylic acid ester may be used instead of the open-chain carbonate or the open-chain ether, and may also be used in combination with the open-chain carbonate or the open-chain ether.

The cyclic carboxylic acid ester include is not particularly limited, but examples thereof preferably include γ-lactones such as γ-butyrolactone, α methyl-γ-butyrolactone and 3-methyl-γ-butyrolactone, β-propiolactone, δ-valerolactone, and the like. The fluoride compounds of these may be used.

Examples of the cyclic ethers include, but are not particularly limited to, tetrahydrofuran, 2-methyltetrahydrofuran, 1,3-dioxolane, 2-methyl-1,3-dioxolane and the like. 2,2-bis(trifluoromethyl)-1,3-dioxolane, 2-(trifluoroethyl) dioxolane and the like which are partially fluorinated may be used.

Examples of the phosphoric acid esters include trimethyl phosphate, triethyl phosphate, tributyl phosphate and the like.

The non-aqueous electrolyte solution may contain the followings in addition to the above. The non-aqueous electrolyte solution may contain aprotic organic solvents including a non-fluorinated open-chain ether such as 1,2-ethoxyethane (DEE) or ethoxymethoxyethane (EME), dimethyl sulfoxide, formamide, acetamide, dimethylformamide, acetonitrile, propionitrile, nitromethane, ethyl monoglyme, trimethoxymethane, dioxolane derivatives, 1,3-dimethyl-2-imidazolidinone, 3-methyl-2-oxazolidinone, propylene carbonate derivatives, tetrahydrofuran derivatives, ethyl ether, 1,3-propane sultone, anisole, N-methylpyrrolidone and the like.

Examples of the supporting salt include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC_4F_9SO_3$, $LiC(CF_3SO_2)_2$, $LiN(CF_3SO_2)_2$, $LiN(C_2F_5SO_2)_2$, and $LiB_{10}Cl_{10}$. In addition, examples of other supporting salts include lithium lower aliphatic carboxylates, chloroborane lithium, lithium tetraphenylborate, LiBr, LiI, LiSCN, and LiCl. One supporting salt may be used alone, or two or more supporting salts may be used in combination. The content of the supporting salt in the electrolyte solution is preferably in the range of 0.3 mol/l or more and 5 mol/l or less.

An ion-conducting polymer may be added to the non-aqueous electrolyte solution. Examples of the ion-conducting polymer include polyethers such as polyethylene oxide and polypropylene oxide, and polyolefins such as polyethylene and polypropylene. In addition, examples of the ion-conducting polymer include polyvinylidene fluoride, polytetrafluoroethylene, polyvinyl fluoride, polyvinyl chloride, polyvinylidene chloride, polymethyl methacrylate, polymethyl acrylate, polyvinyl alcohol, polymethacrylonitrile, polyvinyl acetate, polyvinylpyrrolidone, polycarbonate, polyethylene terephthalate, polyhexamethylene adipamide, polycaprolactam, polyurethane, polyethylenimine, polybutadiene, polystyrene or polyisoprene, or derivatives thereof. One ion-conducting polymer may be used alone, or two or more ion-conducting polymers may be used in combination. In addition, polymers comprising various monomers forming the above polymers may be used.

Further, the electrolyte additive may be added to the non-aqueous electrolyte solution. Examples of the additive include 1,3-propane sultone, cyclic disulfone compounds, nitrile materials, boron materials and the like.

(Positive Electrode)

The positive electrode is constituted by, for example, binding the positive electrode active material to one side or both sides of a positive electrode current collector with a binder for positive electrode. As one aspect of the positive electrode material (positive electrode active material), although it is not particularly limited, spinel materials, layered materials and olivine-based materials may be exemplified.

As the spinel material, $$LiMn_2O_4,$$

materials that operate at around 4V versus lithium in which lifetime is increased by substituting a part of Mn in $LiMn_2O_4$:

$LiMn_{2-x}M_xO_4$ (wherein $0<x<0.3$, M is a metal element and comprises at least one selected from Li, Al, B, Mg, Si, and transition metals), materials that operate at high voltage of around 5 V such as $LiNi_{0.5}Mn_{1.5}O_4$, materials in which a part of the material of $LiMn_2O_4$ is substituted with another element to increase the lifetime:

$$Li_a(M_xMn_{2-x-y}Y_y)(O_{4-w}Z_w) \quad (6)$$

{In formula (6), $0.4 \leq x \leq 1.2$, $0 \leq y$, $x+y<2$, $0 \leq a \leq 1.2$, $0 \leq w \leq 1$, M is a transition metal element and comprises at least one selected from the group consisting of Co, Ni, Fe, Cr and Cu, Y is a metal element and comprises at least one selected from the group consisting of Li, B, Na, Al, Mg, Ti, Si, K and Ca, and Z is at least one selected from the group consisting of F and Cl.}, and the like may be used.

In the above formula of $LiMn_{2-x}M_xO_4$, M comprises metal element(s) selected from Li, Al, B, Mg, Si and transition metals, and a content of these metal elements in compositional ratio x is preferably 80% or more, more preferably 90% or more, and may be 100%.

In formula (6), M comprises transition metal element(s) selected from the group consisting of Co, Ni, Fe, Cr and Cu, and a content of these metal elements in compositional ratio x is preferably 80% or more, more preferably 90% or more, and may be 100%. Y comprises metal element(s) selected from the group consisting of Li, B, Na, Al, Mg, Ti, Si, K and Ca, and a content of these metal elements in compositional ratio y is preferably 80% or more, more preferably 90% or more, and may be 100%.

The layered material is represented by the general formula of $LiMO_2$ (M is a metal element), and specific examples include lithium metal composite oxide having a layered structure represented by:

$LiCo_{1-x}M_xO_2$ ($0 \leq x < 0.3$, and M is a metal other than Co.), $LiNi_{1-x}M_xO_2$ ($0.05 < x < 0.3$, and M is a metal element comprising at least one selected from Co and Al), $$Li(Li_xM_{1-x-z}Mn_z)O_2 \quad (7)$$

{In formula (7), $0.1 \leq x < 0.3$, $0.33 \leq z \leq 0.7$, and M is at least one of Co and Ni.}, and $$Li(M_{1-z}Mn_z)O_2 \quad (8)$$

{In formula (8), $0.33 \leq z \leq 0.7$ and M is at least one of Li, Co and Ni.}.

In the above formula of $LiNi_{1-x}M_xO_2$, M comprises metal element(s) selected from Co and Al, and a content of these metal elements in compositional ratio x is preferably 80% or more, more preferably 90% or more, and may be 100%.

Olivine-type material is represented by the general formula:

$$LiMPO_4$$

(wherein, M is at least one selected from Co, Fe, Mn and Ni.). Specifically, $LiFePO_4$, $LiMnPO_4$, $LiCoPO_4$, $LiNiPO_4$ and the like may be exemplified, and a part thereof may be substituted with another element or the oxygen part thereof may be substituted with fluorine. In the above $LiMPO_4$, it is preferable that M comprises at least one of Co and Ni, and it is more preferable that 80% or more of the compositional ratio of M is Co and/or Ni.

Further, as the positive electrode active material, NASICON type, a lithium transition metal silicon composite oxide and the like may be used. The positive electrode active material may be used singly, or two or more types thereof may be used in mixture.

The positive electrode active material has a specific surface area of, for example, from 0.01 to 5 m²/g, preferably from 0.05 to 4 m²/g, more preferably from 0.1 to 3 m²/g, and still more preferably from 0.15 to 2 m²/g. A specific surface area in such ranges makes it possible to adjust the area in contact with the electrolyte solution within an appropriate range. That is, a specific surface area of 0.01 m²/g or more can facilitate smooth insertion and desorption of lithium ions and further decrease the resistance. Alternatively, a specific surface area of 5 m²/g or less can further suppress promotion of decomposition of electrolyte solution and elution of the constituent elements of the active material.

The median particle size of the lithium manganese composite oxide is preferably from 0.01 to 50 μm and more preferably from 0.02 to 40 μm. A particle size of 0.01 μm or more can further suppress elution of constituent elements of the positive electrode materials and also further suppress deterioration due to contact with the electrolyte solution. In contrast, a particle size of 50 μm or less can facilitate smooth insertion and desorption of lithium ions and further decrease the resistance. The particle size can be measured with a laser diffraction-scattering particle size distribution analyzer.

In another aspect of the present embodiment, the positive electrode active material is not particularly limited as long as the material can absorb and desorb lithium and may be selected from several viewpoints. From the viewpoint of achieving higher energy density, a high capacity compound is preferably contained. Examples of the high capacity compound include lithium acid nickel (LiNiO$_2$), or lithium nickel composite oxides in which a part of the Ni of lithium acid nickel is replaced by another metal element, and layered lithium nickel composite oxides represented by the following formula (A) are preferred.

$$Li_yNi_{(1-x)}M_xO_2 \quad (A)$$

(wherein 0≤x<1, 0<y≤1.2, and M is at least one element selected from the group consisting of Co, Al, Mn, Fe, Ti, and B.)

From the viewpoint of high capacity, it is preferred that the content of Ni is high, that is, x is less than 0.5, further preferably 0.4 or less in the formula (A). Examples of such compounds include Li$_\alpha$Ni$_\beta$Co$_\gamma$Mn$_\delta$O$_2$ (0<α≤1.2, preferably 1≤α≤1.2, β+γ+δ=1, β≥0.7, and γ≤0.2) and Li$_\alpha$Ni$_\beta$Co$_\gamma$Al$_\delta$O$_2$ (0<α≤1.2, preferably 1α≤1.2, β+γ+δ=1, β≥0.6, preferably β≥0.7, and γ≤0.2) and particularly include LiNi$_\beta$Co$_\gamma$Mn$_\delta$O$_2$ (0.75≤β≤0.85, 0.05≤γ≤0.15, and 0.10≤δ≤0.20). More specifically, for example, LiNi$_{0.8}$Co$_{0.05}$Mn$_{0.15}$O$_2$, LiNi$_{0.8}$Co$_{0.1}$Mn$_{0.1}$O$_2$, LiNi$_{0.8}$Co$_{0.15}$Al$_{0.05}$O$_2$, and LiNi$_{0.8}$Co$_{0.1}$Al$_{0.1}$O$_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include Li$_\alpha$Ni$_\beta$Co$_\gamma$Mn$_\delta$O$_2$ (0≤α≤1.2, preferably 1≤α≤1.2, β+γ+δ=1, 0.2≤β≤0.5, 0.1≤γ≤0.4, and 0.1≤δ≤0.4). More specific examples may include LiNi$_{0.4}$Co$_{0.3}$Mn$_{0.3}$O$_2$ (abbreviated as NCM433), LiNi$_{1/3}$Co$_{1/3}$Mn$_{1/3}$O$_2$, LiNi$_{0.5}$Co$_{0.2}$Mn$_{0.3}$O$_2$ (abbreviated as NCM523), and LiNi$_{0.5}$Co$_{0.3}$Mn$_{0.2}$O$_2$ (abbreviated as NCM532) (also including these compounds in which the content of each transition metal fluctuates by about 10%).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni in formula (A) is high (x is 0.4 or less) and a material in which the content of Ni in formula (A) does not exceed 0.5 (x is 0.5 or more, for example, NCM433), a battery having high capacity and high thermal stability can also be formed.

As the positive electrode active material other than the above, for example, lithium manganates having a layered structure or lithium manganates having a spinel structure, such as LiMnO$_2$, Li$_x$Mn$_2$O$_4$ (0<x<2), Li$_2$MnO$_3$, and Li$_x$Mn$_{1.5}$Ni$_{0.5}$O$_4$ (0<x<2); LiCoO$_2$, or materials in which a part of such transition metals is substituted with other metals; materials having Li in an excessive amount as compared with the stoichiometric composition in these lithium transition metal oxides; and materials having an olivine structure such as LiFePO$_4$ may be exemplified. Further, materials obtained by substituting a part of these metal oxides with Al, Fe, P, Ti, Si, Pb, Sn, In, Bi, Ag, Ba, Ca, Hg, Pd, Pt, Te, Zn, La, or the like may also be used. Such positive electrode active materials described above may be used alone, or in combination of two or more thereof.

Examples of a binder for positive electrode include, but are not limited to, polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide. Among these, from the viewpoint of versatility and low cost, polyvinylidene fluoride is preferable. From the viewpoint of a trade-off relationship between "sufficient binding force" and "high energy density", the amount of the binder used for positive electrode is preferably 2 to 10 parts by mass based on 100 parts by mass of the positive electrode active material.

Examples of a positive electrode current collector include aluminum, nickel, silver, and alloys thereof. Their shape includes foil, plate-like and mesh-like.

A conductive assistant may be added to a positive electrode active material layer containing a positive electrode active material in order to reduce impedance. The conductive assistant includes a carbonaceous microparticle such as graphite, carbon black, and acetylene black.

(Negative Electrode)

The negative electrode is constituted by, for example, binding the negative electrode active material to one side or both sides of a negative electrode current collector with a binder for negative electrode.

In the present embodiment, the negative electrode contains a silicon-containing compound as the negative electrode active material. By using such materials, it is possible to increase the capacity of the negative electrode and to achieve a high energy density of the battery.

Examples of the negative electrode active material comprising silicon include:
a Si oxide represented by SiO$_x$ (0<x≤2) such as SiO and SiO$_2$;
a silicon alloy represented by M1$_y$Si$_{1-y}$ (M1 is a metal element and comprises at least one selected from the group consisting of Li, B, Mg, Na, Al, K, Ca, Ti, V, Cr, Mn, Fe, Co, Ni, Cu, and Zn, and 0<y<1);
a silicon composite oxide represented by M2$_z$Si$_{1-z}$O$_w$ (M2 is a metal element and comprises at least one selected from the group consisting of Li, B, Mg, Na, Al, K, Ca, Ti, V, Cr, Mn, Fe, Co, Ni, Cu and Zn, and 0<z<1, 0<w<2); elemental Si; and
a silicon nitride. The negative electrode active material may comprise one type of the silicon-containing compound or two or more thereof.

In M1$_y$Si$_{1-y}$ as the silicon alloy, M1 comprises metal element(s) selected from the group consisting of Li, B, Mg, Na, Al, K, Ca, Ti, V, Cr, Mn, Fe, Co, Ni, Cu, and Zn, and a content of these metal elements in compositional ratio y of M1 is preferably 80% or more, more preferably 90% or more, and may be 100%.

In M2$_z$Si$_{1-z}$O$_w$ as the silicon composite oxide, M2 comprises metal element(s) selected from the group consisting of Li, B, Mg, Na, Al, K, Ca, Ti, V, Cr, Mn, Fe, Co, Ni, Cu and Zn, and a content of these metal elements in compositional ratio y is preferably 80% or more, more preferably 90% or more, and may be 100%.

In the present embodiment, the content of the silicon-containing compound based on the total of the negative electrode active material is preferably 30 wt % or more, more preferably 50 wt % or more, further preferably 80 wt % or more and it may be 100 wt %.

As the negative electrode active material, another negative electrode active material may be contained in addition to the silicon-based material. Examples thereof include a carbon material (a) that can absorb and desorb a lithium ion, a metal (b) that can be alloyed with lithium, and a metal oxide (c) that can absorb and desorb a lithium ion.

As a carbon material (a), graphite, amorphous carbon, diamond-like carbon, a carbon nanotube, or a composite thereof may be used. Highly crystalline graphite has high electrical conductivity and excels in voltage flatness and adhesiveness with a positive electrode current collector composed of a metal such as copper. On the other hand, low crystalline amorphous carbon has comparatively small volume expansion and therefore has large effect to relax volume expansion of the whole negative electrode, and degradation derived from ununiformity such as a grain boundary or a defect is difficult to occur therein. The content of the carbon material (a) in the negative electrode active material may be in the range of preferably 0 mass % or more and 80 mass % or less, and more preferably in the range of 2 mass % or more and 80 mass % or less, and further preferably in the range of 2 mass % or more and 30 mass % or less. The surface of the silicon-containing compound may be coated with the carbon material (a).

As the metal (b), a metal mainly comprising Al, Pb, Sn, Zn, Cd, Sb, In, Bi, Ag, Ba, Ca, Hg, Pd, Pt, Te, La or the like; or an alloy containing two or more thereof; or an alloy of lithium with these metals or alloys and the like may be used. The content of the metal (b) in the negative electrode active material may be in the range of preferably 0 mass % or more and 90 mass % or less, more preferably in the range of 5 mass % or more and 90 mass % or less, and further preferably in the range of 20 mass % or more and 50 mass % or less.

As the metal oxide (c), aluminum oxide, tin oxide such as SnO, $SnO_2$, indium oxide, zinc oxide, lithium oxide or a composite thereof, $LiFe_2O_3$, $WO_2$, $MoO_2$, CuO, $Nb_3O_5$, $Li_xTi_{2-x}O_4$ ($1 \leq x \leq 4/3$), $PbO_2$, $Pb_2O_5$ and the like. One or more elements selected from nitrogen, boron, and sulfur may also be added to the metal oxide (c), for example, in an amount of 0.1 to 5% by mass. By doing this, the electrical conductivity of the metal oxide (c) is improved. The content of the metal oxide (c) in the negative electrode active material is preferably in the range of 0% by mass or more and 90% by mass or less, more preferably in the range of 5% by mass or more and 90% by mass or less, and further preferably 40% by mass or more and 70% by mass or less.

In addition, the negative electrode active materials may include, for example, a metal sulfide (d) capable of absorbing and desorbing lithium ions. Examples of the metal sulfide (d) include SnS and $FeS_2$. In addition, examples of the negative electrode active material may include metal lithium or lithium alloys, polyacene or polythiophene, or lithium nitride such as $Li_5(Li_3N)$, $Li_7MnN_4$, $Li_3FeN_2$, $Li_{2.5}Co_{0.5}N$, or $Li_3CoN$.

The negative electrode active material may comprise the carbon material (a), the metal (b), the metal oxide (c), the metal sulfide (d) and the like singly or in combination of two or more thereof in addition to the silicon-containing compound.

The shape of the negative electrode active material such as the silicon-based negative electrode active material, the carbon material (a), the metal (b) and the metal oxide (c) is not particularly limited, but particulate ones may be used respectively.

These negative electrode active materials have a specific surface area of, for example, from 0.01 to 20 $m^2/g$, preferably from 0.05 to 15 $m^2/g$, more preferably from 0.1 to 10 $m^2/g$, and still more preferably from 0.15 to 8 $m^2/g$. A specific surface area in such ranges makes it possible to adjust the area in contact with the electrolyte solution within an appropriate range. That is, a specific surface area of 0.01 $m^2/g$ or more can facilitate smooth insertion and desorption of lithium ions and further decrease the resistance. Alternatively, a specific surface area of 20 $m^2/g$ or less can suppress decomposition of electrolyte solution and elution of the constituent elements of the active material.

The median particle diameter of the negative electrode active material is preferably 0.01 to 50 μm, more preferably 0.02 to 40 μm. By setting the particle diameter to 0.02 μm or more, the dissolution of the constituent elements of the positive electrode material can be further suppressed, and deterioration due to contact with the electrolyte solution can be further suppressed. In addition, by setting the particle diameter to 50 μm or less, the insertion and desorption of lithium ions are easily smoothly performed, and the resistance can be further reduced. The evaluation can be measured with a laser diffraction-scattering type particle size distribution analyzer.

The binder for negative electrode is not particularly limited, but examples thereof include polyvinylidene fluoride (PVdF), vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, and polyamideimides.

The content of the negative electrode binder is preferably in the range of 1 to 40% by mass, more preferably 1.5 to 30% by mass, based on the total amount of the negative electrode active material and the negative electrode binder. By setting the content to 1% by mass or more, the adhesiveness between the active materials or between the active material and the current collector is improved, and the cycle characteristics are good. In addition, by setting the content to 30% by mass or less, the active material ratio is increased and thus the negative electrode capacity can be improved.

The negative electrode current collector is not particularly limited, but aluminum, nickel, copper, silver, iron, chromium, molybdenum and alloys thereof are preferred because of electrochemical stability. Examples of its shape include foil, a flat plate shape, and a mesh shape.

The negative electrode can be made by forming a negative electrode active material layer comprising the negative electrode active material and the binder for negative electrode on the negative electrode current collector. Examples of the method for forming the negative electrode active material layer include a doctor blade method, a die coater method, a CVD method, and a sputtering method. It is possible to previously form a negative electrode active material layer and then form a thin film of aluminum, nickel, or an alloy thereof by a method such as vapor deposition or sputtering to provide a negative electrode current collector.

(Separator)

The secondary battery may be constituted by a combination of a positive electrode, a negative electrode, a separator, and a non-aqueous electrolyte solution. Examples of the separator include woven fabrics, nonwoven fabrics, porous polymer films of polyolefins, such as polyethylene and polypropylene, polyimides and porous polyvinylidene fluoride films, and the like, or ion-conducting polymer electrolyte films. These may be used alone or in combination thereof.

(Shape of Battery)

Examples of the shape of the secondary battery include a cylindrical shape, a rectangular shape, a coin type, a button type, and a laminate type. Examples of the outer package of the battery include stainless, iron, aluminum, titanium, or alloys thereof, or plated articles thereof. As the plating, for example, nickel plating may be used.

Examples of the laminate resin film used in a laminate type include aluminum, aluminum alloy, stainless-steel and titanium foil. Examples of the material of the thermally bondable portion of the metal laminate resin film include thermoplastic polymer materials, such as polyethylene, polypropylene, and polyethylene terephthalate. In addition, each of the numbers of the metal laminate resin layers and the metal foil layers is not limited to one and may be two or more.

Figure 2:
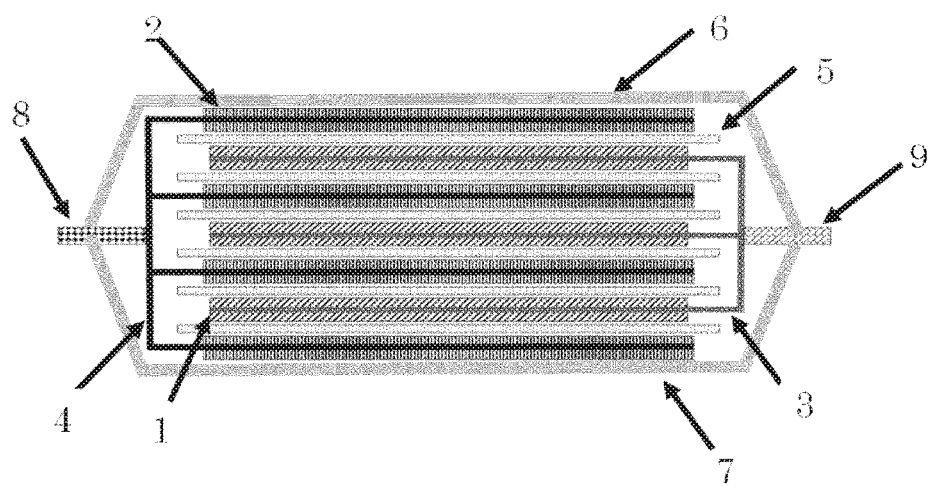
FIG. 2 is a schematic cross-sectional view showing the structure of a stacking laminate type secondary battery according to one embodiment of the present invention.

FIG. 1 shows an example of the structure of the secondary battery according to the present embodiment. A lithium secondary battery comprises a positive electrode active material layer 1 containing a positive electrode active material on a positive electrode current collector 3 formed of a metal, such as aluminum foil, and a negative electrode active material layer 2 containing a negative electrode active material on a negative electrode current collector 4 formed of a metal, such as copper foil. The positive electrode active material layer 1 and the negative electrode active material layer 2 are disposed so as to face each other via an electrolyte solution and a separator 5 formed of a nonwoven fabric, a polypropylene microporous film, or the like comprising the electrolyte solution. In FIG. 1, reference numerals 6 and 7 denote a laminate package, reference numeral 8 denotes a negative electrode tab, and reference numeral 9 denotes a positive electrode tab. As shown in FIG. 2, the electrode element (also described as a "battery element" or an "electrode laminate") may have an arrangement in which a plurality of positive electrodes and a plurality of negative electrodes are stacked via separators.

Figure 3:
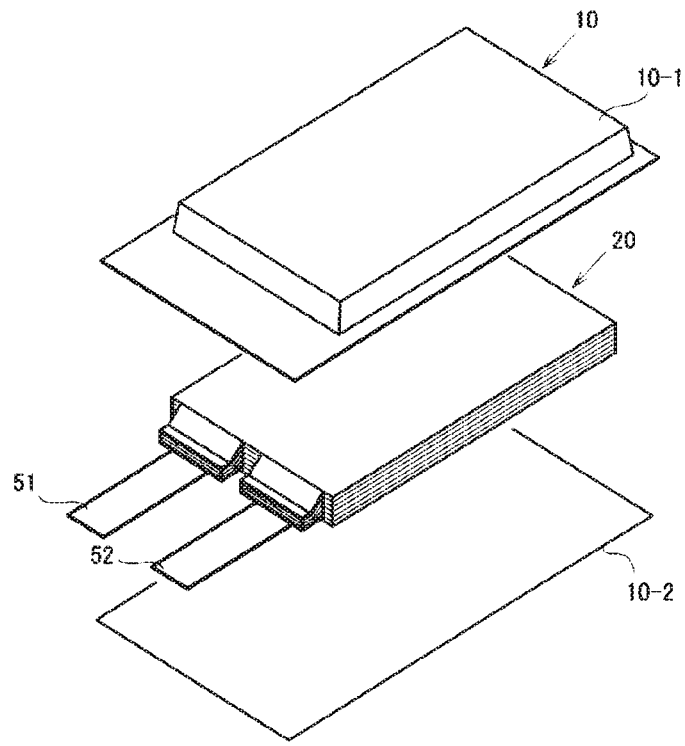
FIG. 3 is an exploded perspective view showing the basic structure of a film-packaged battery.
Figure 4:
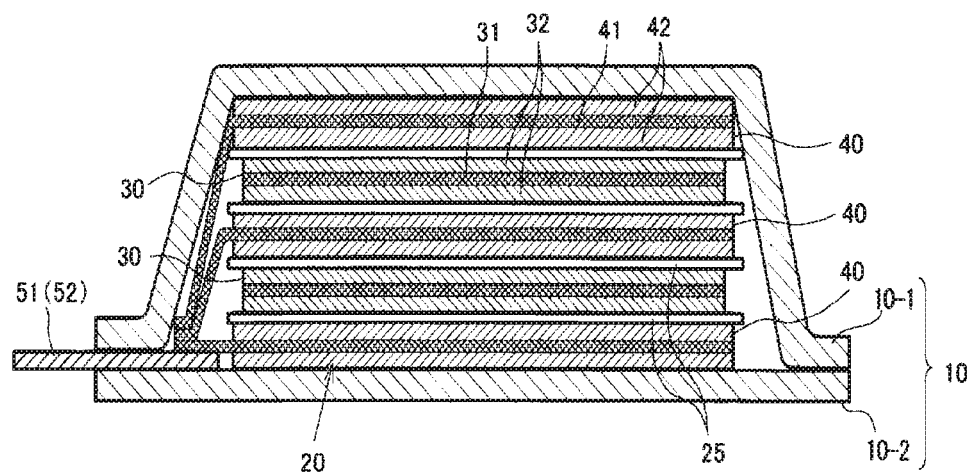
FIG. 4 is a cross-sectional view schematically showing a cross section of the battery in FIG. 3.

As another embodiment, a secondary battery having a structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1 and FIG. 2, the electrode tabs are drawn out on both sides of the package, but a secondary battery to which the present invention may be applied may have an arrangement in which the electrode tabs are drawn out on one side of the package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

In addition, one aspect of the present embodiment relates to a method of producing a secondary battery. That is, a method of producing a secondary battery comprising an electrode element,
an electrolyte solution and an outer package, comprising:
a step of preparing a negative electrode comprising a negative electrode active material comprising a silicon-containing compound;
a step of preparing an electrode element by placing a positive electrode and the negative electrode so as to face each other; and
a step of encapsulating the electrode element and the electrolyte solution in the outer package,
wherein the electrolyte solution comprises:
at least one selected from fluorine-containing ether compounds represented by the following formula (1),
at least one selected from fluorine-containing phosphoric acid ester compounds represented by the following formula (2),
at least one selected from sulfone compounds represented by the following formula (3), and
at least one selected from cyclic carbonate compounds, and wherein
a content of the fluorine-containing ether compound represented by the formula (1) in the electrolyte solution is 10 vol % or more and 80 vol % or less,
a content of the fluorine-containing phosphoric acid ester compound represented by the formula (2) in the electrolyte solution is 1 vol % or more and 50 vol % or less,
a content of the sulfone compound represented by the formula (3) is 1 vol % or more and 50 vol % or less, and
a content of the cyclic carbonate compound is 1 vol % or more and 40 vol % or less;

$$R_1\text{—}O\text{—}R_2 \qquad (1)$$

{In formula (1), $R_1$ and $R_2$ are each independently an alkyl group or a fluorine-containing alkyl group, and at least one of $R_1$ and $R_2$ is a fluorine-containing alkyl group.};

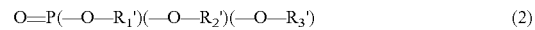

$$O=P(\text{—}O\text{—}R_1')(\text{—}O\text{—}R_2')(\text{—}O\text{—}R_3') \qquad (2)$$

{In formula (2), $R_1'$, $R_2'$ and $R_3'$ are each independently an alkyl group or a fluorine-containing alkyl group, and at least one of $R_1'$, $R_2'$ and $R_3'$ is a fluorine-containing alkyl group.};

$$R_1''\text{—}SO_2\text{—}R_2'' \qquad (3)$$

{In formula (3), $R_1''$ and $R_2''$ are each independently a substituted or unsubstituted alkyl group or alkylene group, and carbon atoms in $R_1''$ and $R_2''$ may be bonded through a single bond or a double bond to form a cyclic compound.}

EXAMPLES

Specific examples according to the present invention will be described below, but the present invention is not limited to these Examples and can be carried out by making appropriate changes without departing from the spirit thereof. FIG. 1 is a schematic diagram showing the configuration of a lithium secondary battery made in these Examples.

Abbreviations used in the following Examples and Comparative Examples will be described.

EC: ethylene carbonate
PC: propylene carbonate
FEC: monofluoroethylene carbonate (4-fluoro-1,3-dioxolan-2-one)
FE1: 1,1,2,2-tetrafluoroethyl-2,2,3,3-tetrafluoropropyl ether
FP1: tris(2,2,2-trifluoroethyl) phosphate
SL: sulfolane
MSL: 3-methylsulfolane
DMS: dimethylsulfone
EMS: ethyl methyl sulfone
DES: diethylsulfone
EiPS: ethyl isopropyl sulfone Example 1

$LiNi_{0.5}Mn_{0.3}Co_{0.2}O_2$ (92% by mass) as a positive electrode active material, polyvinylidene fluoride (4% by mass) as a binder, and carbon black (4% by mass) as a conductive agent were mixed to prepare a positive electrode mixture. The positive electrode mixture was dispersed in N-methyl-2-pyrrolidone to prepare positive electrode slurry. One surface of a 20 μm thick aluminum current collector was uniformly coated with this positive electrode slurry. The thickness of the coating film was adjusted so that the initial charge capacity per unit area was 2.5 mAh/cm². The coated current collector was dried and then compression-shaped by a roll press to make a positive electrode.

As a negative electrode active material, SiO in which the surface of SiO was coated with carbon was used. Mass ratio of SiO and the carbon was 95/5. SiO described below is a composite material with 5 wt % of carbon surface-treated. The SiO was dispersed in N-methylpyrrolidone in which polyimide binder is dissolved, to prepare a negative electrode slurry. The mass ratio of the negative electrode active material to the binder material was 85/15. A thickness of 10 μm Cu current collector was uniformly coated with this negative electrode slurry. The thickness of the coating film was adjusted so that the initial charge capacity per unit area was 3.0 mAh/cm².

The positive electrode and the negative electrode cut into 3 cm×3 cm were disposed so as to be opposed to each other via a separator. For the separator, a 25 μm thickness of microporous polypropylene film was used.

Non-aqueous solvent of the compounds and the volume ratio shown in Table 1 was used. $LiPF_6$ was dissolved in this non-aqueous solvent at a concentration of 0.8 mol/l to prepare an electrolyte solution.

The above positive electrode, negative electrode, separator, and electrolyte solution were disposed in a laminate package, and the laminate was sealed to make a lithium secondary battery. The positive electrode and the negative electrode were brought into a state in which tabs were connected and the positive electrode and the negative electrode were electrically connected from the outside of the laminate.
(Cycle Characteristics)

This battery was charged at 20 mA, and after the upper limit voltage reached 4.4 V, the battery was charged at constant voltage until the total charge time reached 2.5 hours. Then, the battery was discharged at 20 mA at constant current until a lower limit voltage of 2.5 V was reached. This charge and discharge was repeated 300 times. The cell was disposed in a thermostat chamber at 45° C., and charge and discharge were carried out. The ratio of capacity in the 300th cycle to capacity in the 1st cycle, {(capacity at the 300th cycle/capacity of the 1st cycle)×100}(%), was evaluated as capacity retention ratio after 300 cycles at 45° C.

Examples 2 to 17, Examples 101-102 and Comparative Examples 1, 2

Lithium secondary batteries were manufactured and cycle characteristics were evaluated in the same manner as in Example 1 except that compositions of the non-aqueous solvent were changed as shown in Table 1 by changing the type and content of sulfone compounds in the non-aqueous electrolyte solution. Table 1 shows the compositions of the electrolyte solutions and the results of the cycle characteristic evaluation (capacity retention ratio).

TABLE 1

| | cyclic carbonate (vol %) | sulfone compound (vol %) | fluorinated ether compound (vol %) | fluorinated phosphoric acid ester (vol %) | capacity retention ratio |
|---|---|---|---|---|---|
| Comp-Ex. 1 | EC: 10% | SL: 0% | FE1: 70% | FP1: 20% | 51% |
| Ex. 1 | EC: 10% | SL: 1% | FE1: 69% | FP1: 20% | 71% |
| Ex. 2 | EC: 10% | SL: 2% | FE1: 68% | FP1: 20% | 75% |
| Ex. 3 | EC: 10% | SL: 5% | FE1: 65% | FP1: 20% | 76% |
| Ex. 4 | EC: 10% | SL: 10% | FE1: 60% | FP1: 20% | 82% |
| Ex. 5 | EC: 10% | SL: 20% | FE1: 50% | FP1: 20% | 83% |
| Ex. 6 | EC: 10% | SL: 30% | FE1: 40% | FP1: 20% | 82% |
| Ex. 7 | EC: 10% | SL: 40% | FE1: 30% | FP1: 20% | 81% |
| Ex. 8 | EC: 10% | SL: 50% | FE1: 20% | FP1: 20% | 80% |
| Comp-Ex. 2 | EC: 10% | SL: 70% | FE1: 0% | FP1: 20% | 62% |
| Ex. 9 | EC: 10% | SL: 18% + DMS: 2% | FE1: 50% | FP1: 20% | 83% |
| Ex. 10 | EC: 10% | SL: 15% + EMS: 5% | FE1: 50% | FP1: 20% | 83% |
| Ex. 11 | EC: 10% | SL: 15% + EiPS: 5% | FE1: 50% | FP1: 20% | 82% |
| Ex. 12 | EC: 10% | MSL: 20% | FE1: 50% | FP1: 20% | 82% |
| Ex. 13 | EC: 10% | DES: 20% | FE1: 50% | FP1: 20% | 82% |
| Ex. 14 | EC: 10% | EiPS: 18% + MSL: 2% | FE1: 50% | FP1: 20% | 81% |
| Ex. 15 | EC: 10% | MSL: 20% + DMS: 5% | FE1: 45% | FP1: 20% | 83% |
| Ex. 16 | EC: 10% | MSL: 20% + EMS: 5% | FE1: 45% | FP1: 20% | 83% |
| Ex. 17 | EC: 10% | MSL: 20% + DES: 5% | FE1: 45% | FP1: 20% | 83% |
| Ex. 101 | EC: 10% | EMS: 20% | FE1: 50% | FP1: 20% | 75% |
| Ex. 102 | EC: 10% | EiPS: 20% | FE1: 50% | FP1: 20% | 80% |

Comp-Ex.: Comparative Example
Ex.: Example

As shown in Table 1, the composition of the sulfone compound in the electrolyte solution is preferably 1 vol % or more and 50 vol % or less, more preferably 2 vol % or more and 50 vol % or less. By using sulfolane, 3-methylsulfolane, dimethylsulfone, ethyl methyl sulfone, diethyl sulfone or ethyl isopropyl sulfone, good characteristics was exhibited. Also, when a cyclic sulfone and an open-chain sulfone were mixed, good characteristics was exhibited.

Examples 18-30, Examples 103-107 and Comparative Example 3

Evaluation was conducted by changing the type and content of the cyclic carbonate in the non-aqueous electrolyte solution. Lithium-ion secondary batteries were manufactured and cycle characteristics thereof were evaluated in the same manner as in Example 1 except that the compositions of the non-aqueous solvent of the non-aqueous electrolyte solution were changed as shown in Table 2. Table 2 shows the composition of the electrolyte solution and the results of the cycle characteristic evaluation (capacity retention ratios).

TABLE 2

|  | cyclic carbonate (vol %) | sulfone (vol %) | fluorinated ether (vol %) | fluorinated phosphoric acid ester (vol %) | capacity retention ratio (%) |
|---|---|---|---|---|---|
| Comp-Ex. 3 | EC: 0% | SL: 20% | FE1: 60% | FP1: 20% | 40% |
| Ex. 18 | EC: 1% | SL: 20% | FE1: 59% | FP1: 20% | 69% |
| Ex. 19 | EC: 2% | SL: 20% | FE1: 58% | FP1: 20% | 76% |
| Ex. 20 | EC: 5% | SL: 20% | FE1: 50% | FP1: 20% | 81% |
| Ex. 21 | EC: 10% | SL: 20% | FE1: 50% | FP1: 20% | 82% |
| Ex. 22 | EC: 20% | SL: 20% | FE1: 40% | FP1: 20% | 83% |
| Ex. 23 | EC: 25% | SL: 20% | FE1: 35% | FP1: 20% | 83% |
| Ex. 24 | EC: 30% | SL: 20% | FE1: 30% | FP1: 20% | 83% |
| Ex. 25 | EC: 40% | SL: 20% | FE1: 20% | FP1: 20% | 79% |
| Ex. 26 | EC: 8% + PC: 2% | SL: 20% | FE1: 50% | FP1: 20% | 82% |
| Ex. 27 | EC: 5% + PC: 5% | SL: 20% | FE1: 50% | FP1: 20% | 83% |
| Ex. 28 | EC: 2% + PC: 8% | SL: 20% | FE1: 50% | FP1: 20% | 84% |
| Ex. 29 | PC: 10% | SL: 20% | FE1: 50% | FP1: 20% | 70% |
| Ex. 30 | FEC: 2% + PC: 8% | SL: 20% | FE1: 50% | FP1: 20% | 82% |
| Ex. 103 | EC: 0% | DES: 30% | FE1: 50% | FP1: 20% | 60% |
| Ex. 104 | EC: 1% | DES: 29% | FE1: 50% | FP1: 20% | 78% |
| Ex. 105 | EC: 2% | DES: 28% | FE1: 50% | FP1: 20% | 84% |
| Ex. 106 | EC: 5% | DES: 25% | FE1: 50% | FP1: 20% | 82% |
| Ex. 107 | EC: 5% | EiPS: 25% | FE1: 50% | FP1: 20% | 80% |

Comp-Ex.: Comparative Example
Ex.: Example

As shown in Table 2, the concentration of the cyclic carbonate in the electrolyte solution is preferably 1 vol % or more and 40 vol % or less, more preferably 2 vol % or more and 30 vol % or less, further preferably 5 vol % or more and 25 vol % or less. The life characteristics are improved by replacing a part of the EC with PC, but if only PC is comprised and neither EC nor FEC is comprised, the capacity retention rate after cycles decreases. It is considered that when EC or FEC is present in the solvent, film is formed on the negative electrode and thereby decomposition of the other solvents on the negative electrode can be suppressed.

Examples 31 to 58, Examples 108-112 and Comparative Examples 4 and 5

The cases were investigated where the type and content of fluorinated ethers and fluorinated phosphoric acid esters in the electrolyte solution were changed. Table 3 shows that the results of experiments conducted in the same manner as in Example 1, except that the composition of the non-aqueous solvent of the electrolyte solution was changed as shown in Table 3. Fluorinated ethers and fluorinated phosphoric acid esters as described below were used. In the Table, they are indicated by the abbreviation.

(Fluorinated Ether)
FE1: 1,1,2,2-tetrafluoroethyl 2,2,3,3-tetrafluoropropyl ether
FE2: 2,2,3,4,4,4-hexafluorobutyl difluoromethyl ether
FE3: 1,1-difluoroethyl 2,2,3,3-tetrafluoropropyl ether
FE4: 1,1,2,3,3,3-hexafluoropropyl 2,2-difluoroethyl ether
FE5: 1,1-difluoroethyl 1H, 1H-heptafluorobutyl ether
FE6: 1H, 1H, 2′H, 3H-decafluorodipropyl ether
FE7: bis(2,2,3,3,3-pentafluoropropyl) ether
FE8: 1H, 1H, 5H-perfluoropentyl 1,1,2,2-tetrafluoroethyl ether
FE9: bis(1H, 1H-heptafluorobutyl)ether
FE10: 1H, 1H, 2′H-perfluorodipropyl ether
FE11: 1,1,2,3,3,3-hexafluoropropyl 1H, 1H-heptafluorobutyl ether
FE12: 1H-perfluorobutyl 1H-perfluoroethyl ether
FE13: bis(2,2,3,3-tetrafluoropropyl)ether (Fluorinated Phosphoric Acid Ester)
FP1: tris(2,2,2-trifluoroethyl) phosphate
FP2: tris(2,2,3,3,3-pentafluoropropyl) phosphate
FP3: tris(1H, 1H-heptafluorobutyl) phosphate

TABLE 3

|  | cyclic carbonate (vol %) | sulfone (vol %) | fluorinated ether (vol %) | fluorinated phosphoric acid ester (vol %) | capacity retention ratio (%) |
|---|---|---|---|---|---|
| Comp-Ex. 4 | EC: 10% | SL: 20% | FE1: 0% | FP1: 70% | 65% |
| Ex. 31 | EC: 10% | SL: 20% | FE1: 20% | FP1: 50% | 75% |
| Ex. 32 | EC: 10% | SL: 20% | FE1: 40% | FP1: 30% | 79% |
| Ex. 33 | EC: 10% | SL: 20% | FE1: 50% | FP1: 20% | 83% |
| Ex. 34 | EC: 10% | SL: 20% | FE1: 60% | FP1: 10% | 82% |
| Ex. 35 | EC: 10% | SL: 20% | FE1: 65% | FP1: 5% | 80% |
| Ex. 108 | EC: 10% | SL: 20% | FE1: 69% | FP1: 1% | 79% |
| Comp-Ex. 5 | EC: 10% | SL: 20% | FE1: 70% | FP1: 0% | 78% |
| Ex. 36 | EC: 10% | SL: 20% | FE1: 30% + FE2: 20% | FP1: 20% | 82% |
| Ex. 37 | EC: 10% | SL: 20% | FE3: 50% | FP1: 20% | 82% |
| Ex. 38 | EC: 3% + PC: 7% | SL: 20% | FE1: 30% + FE4: 20% | FP1: 20% | 81% |
| Ex. 39 | EC: 3% + PC: 7% | SL: 20% | FE1: 30% + FE5: 20% | FP1: 20% | 81% |
| Ex. 40 | EC: 3% + PC: 7% | SL: 20% | FE1: 30% + FE6: 20% | FP1: 20% | 80% |
| Ex. 41 | EC: 3% + PC: 7% | SL: 20% | FE1: 30% + FE7: 20% | FP1: 20% | 85% |
| Ex. 42 | EC: 3% + PC: 7% | MSL: 20% | FE1: 30% + FE8: 20% | FP1: 20% | 82% |
| Ex. 43 | EC: 3% + PC: 7% | MSL: 20% | FE1: 30% + FE9: 20% | FP1: 20% | 81% |
| Ex. 44 | EC: 3% + PC: 7% | MSL: 20% | FE1: 40% + FE10: 10% | FP1: 20% | 82% |

TABLE 3-continued

| | cyclic carbonate (vol %) | sulfone (vol %) | fluorinated ether (vol %) | fluorinated phosphoric acid ester (vol %) | capacity retention ratio (%) |
|---|---|---|---|---|---|
| Ex. 45 | EC: 3% + PC: 7% | MSL: 20% | FE1: 30% + FE11: 20% | FP1: 20% | 84% |
| Ex. 46 | EC: 3% + PC: 7% | MSL: 20% | FE1: 30% + FE12: 20% | FP1: 20% | 81% |
| Ex. 47 | EC: 3% + PC: 7% | SL: 20% | FE13: 50% | FP1: 20% | 85% |
| Ex. 48 | EC: 3% + PC: 7% | SL: 15% + DMS: 5% | FE1: 30% + FE3: 20% | FP1: 20% | 82% |
| Ex. 49 | FEC: 2% + PC: 8% | SL: 15% + EMS: 5% | FE1: 30% + FE4: 20% | FP1: 20% | 82% |
| Ex. 50 | EC: 5% + PC: 5% | MSL: 15% + DMS: 5% | FE1: 30% + FE5: 20% | FP1: 20% | 82% |
| Ex. 51 | EC: 5% + PC: 5% | MSL: 20% | FE1: 30% + FE6: 20% | FP1: 20% | 81% |
| Ex. 52 | EC: 5% + PC: 5% | MSL: 20% | FE13: 50% | FP1: 20% | 86% |
| Ex. 53 | EC: 3% + PC: 7% | MSL: 20% | FE7: 50% | FP1: 20% | 85% |
| Ex. 54 | EC: 3% + PC: 7% | SL: 20% | FE1: 50% | FP2: 20% | 81% |
| Ex. 55 | EC: 3% + PC: 7% | SL: 20% | FE1: 50% | FP3: 20% | 80% |
| Ex. 56 | EC: 5% | SL: 5% | FE1: 80% | FP1: 10% | 80% |
| Ex. 57 | EC: 5% | SL: 10% | FE1: 75% | FP1: 10% | 81% |
| Ex. 58 | EC: 5% + PC: 10% | SL: 40% | FE1: 20% | FP1: 25% | 80% |
| Ex. 109 | EC: 3% | DES: 27% | FE6: 65% | FP1: 5% | 80% |
| Ex. 110 | EC: 3% | DES: 27% | FE13: 65% | FP1: 5% | 81% |
| Ex. 111 | EC: 3% | EiPS: 27% | FE6: 65% | FP1: 5% | 77% |
| Ex. 112 | EC: 3% | EiPS: 27% | FE13: 65% | FP1: 5% | 79% |

Comp-Ex.: Comparative Example
Ex.: Example

As shown in Table 3, as a result of evaluation by changing the compositions of fluorinated ethers and fluorinated phosphoric acid esters, when the fluorinated phosphoric acid ester is contained in the electrolyte solution in the range of 1 vol % or more and 50 vol % or less, the capacity retention rate is high and preferable, and 5 vol % or more and 50 vol % or less is more preferable. Such ranges make it possible to maintain high capacity retention ratio. The content of the fluorinated ether in the electrolyte solution is preferably 20 vol % or more and 80 vol % or less, and further preferably 20 vol % or more and 75 vol % or less. In particular, when FE1, FE7, FE11 or FE13 is comprised, the capacity retention ratio was high. Further, two types of fluorinated ethers are comprised, capacity retention ratio was high in some cases.

Examples 59-69, Comparative Examples 6-16

Evaluation was made on the battery using the positive electrode active material and/or the negative electrode active material changed from Example 1. Secondary batteries were manufactured in the same manner as in Example 1 except that the positive electrode active material, the negative electrode active material and the electrolyte solution shown in Table 4 were used. In Comparative Examples 6 to 16, electrolyte solutions containing only carbonate-based compounds were used; and in Examples 59 to 69, electrolyte solutions containing fluorinated ether(s), fluorinated phosphoric acid ester(s), sulfone compound(s), and cyclic carbonate(s) were used. As shown in Table 4, a voltage range that was almost fully charged was selected depending on the type of the electrode, and a charge/discharge cycle characteristic test was conducted in the same manner as in Example 1. The results of the capacity retention ratio after 300 cycles at 45° C. (capacity at the time of 300 cycles/capacity at the first cycle) are shown in Table 4.

As the negative electrode active material, SiO, Si, $Ni_{0.2}Si_{0.5}$, $Fe_{0.2}Si_{0.8}$ or $Ni_{0.2}Si_{0.8}O$ was used. With respect to Si, $Ni_{0.2}Si_{0.8}$, $Fe_{0.2}Si_{0.8}$ and $Ni_{0.2}Si_{0.8}O$, carbon and Si-based compound were weighed so that the mass ratio of carbon and Si-based compound was 90:10, they were pulverized and mixed with a ball mill and then, the composite material was used as the active material. Polyimide resin binder was used as the negative electrode binder, and a slurry was prepared by mixing the composite material containing a negative electrode active material and the binder in a composition ratio of 85/15 (mass ratio). The slurry was applied on a negative electrode current collector.

TABLE 4

| | positive electrode active material | negative electrode active material | solvent composition of electrolyte solution (volume ratio) | charge/discharge voltage range | capacity retention ratio |
|---|---|---|---|---|---|
| Comp-Ex. 6 | LiCoO$_2$ | Si | EC/DEC = 3/7 | 4.35 V-3.0 V | 45% |
| Ex. 59 | LiCoO$_2$ | Si | EC/SL/FE1/FP1 = 1/2/5/2 | 4.35 V-3.0 V | 76% |

TABLE 4-continued

| | positive electrode active material | negative electrode active material | solvent composition of electrolyte solution (volume ratio) | charge/ discharge voltage range | capacity retention ratio |
|---|---|---|---|---|---|
| Comp-Ex. 7 | $Li(Ni_{1/3}Co_{1/3}Mn_{1/3})O_2$ | Si | EC/DEC = 3/7 | 4.4 V-3.0 V | 65% |
| Ex. 60 | $Li(Ni_{1/3}Co_{1/3}Mn_{1/3})O_2$ | Si | EC/PC/SL/FE1/FP1 = 5/5/20/50/20 | 4.4 V-3.0 V | 80% |
| Comp-Ex. 8 | $Li(Ni_{0.8}Co_{0.15}Al_{0.05})O_2$ | $Ni_{0.2}Si_{0.8}$ | EC/DEC = 3/7 | 4.2 V-3.0 V | 61% |
| Ex. 61 | $Li(Ni_{0.8}Co_{0.15}Al_{0.05})O_2$ | $Ni_{0.2}Si_{0.8}$ | EC/MSL/FE1/FP1 = 1/2/5/2 | 4.2 V-3.0 V | 79% |
| Comp-Ex. 9 | $Li(Mn_{1.88}Li_{0.12})O_4$ | $Ni_{0.2}Si_{0.8}$ | EC/DEC = 3/7 | 4.2 V-3.0 V | 58% |
| Ex. 62 | $Li(Mn_{1.88}Li_{0.12})O_4$ | SiO | EC/MSL/FE7/FP1 = 1/2/5/2 | 4.2 V-3.0 V | 75% |
| Comp-Ex. 10 | $LiFePO_4$ | $Fe_{0.2}Si_{0.8}$ | EC/DEC = 3/7 | 3.4 V-2.0 V | 59% |
| Ex. 63 | $LiFePO_4$ | $Fe_{0.2}Si_{0.8}$ | EC/MSL/DES/FE1/FP1 = 10/10/10/50/20 | 3.4 V-2.0 V | 79% |
| Comp-Ex. 11 | $LiCoPO_4$ | Si | EC/DEC = 3/7 | 4.9 V-3.0 V | 40% |
| Ex. 64 | $LiCoPO_4$ | Si | FEC/PC/SL/FE13/FP1 = 2/13/20/45/20 | 4.9 V- 3.0 V | 72% |
| Comp-Ex. 12 | $LiMn_{0.8}Fe_{0.2}PO_4$ | SiO | EC/DEC = 3/7 | 4.2 V-3.0 V | 56% |
| Ex. 65 | $LiMn_{0.8}Fe_{0.2}PO_4$ | SiO | EC/SL/FE1/FE6/FP1 = 1/2/3/2/2 | 4.2 V-3.0 V | 73% |
| Comp-Ex. 13 | $LiNi_{0.5}Mn_{1.5}O_4$ | SiO | EC/DEC = 3/7 | 4.8-3 V | 30% |
| Ex. 66 | $LiNi_{0.5}Mn_{1.5}O_4$ | SiO | EC/MSL/FE1/FP1/FP3 = 1/2/5/1/1 | 4.8-3 V | 72% |
| Comp-Ex. 14 | $LiNi_{0.5}Mn_{1.3}Ti_{0.2}O_4$ | $Ni_{0.2}Si_{0.8}O$ | EC/DEC = 3/7 | 4.8-3 V | 30% |
| Ex. 67 | $LiNi_{0.5}Mn_{1.3}Ti_{0.2}O_4$ | $Ni_{0.2}Si_{0.8}O$ | EC/MSL/FE1/FP1 = 1/2/5/2 | 4.8-3 V | 76% |
| Comp-Ex. 15 | $LiNi_{0.2}Fe_{0.4}Mn_{1.4}O_4$ | $Fe_{0.2}Si_{0.8}O$ | EC/DEC = 3/7 | 4.9-3 V | 10% |
| Ex. 68 | $LiNi_{0.2}Fe_{0.4}Mn_{1.4}O_4$ | $Fe_{0.2}Si_{0.8}O$ | EC/SL/FE1/FE9/FP1 = 1/2/3/2/2 | 4.9-3 V | 70% |
| Comp-Ex. 16 | $Li_{1.2}Ni_{0.2}Mn_{0.6}O_2$ | SiO | EC/DEC = 3/7 | 4.5-1.5 V | 35% |
| Ex. 69 | $Li_{1.2}Ni_{0.2}Mn_{0.6}O_2$ | SiO | EC/MSL/FE1/FP1 = 1/2/5/2 | 4.5-1.5 V | 70% |

Comp-Ex.: Comparative Example
Ex.: Example

As shown in Table 4, in the case where the types of active materials of the positive electrode and the negative electrode were changed, it was confirmed that cycle characteristics were improved by using an electrolyte solution containing a cyclic carbonate compound, a sulfone compound, a fluorinated ether compound and a fluorinated phosphoric acid ester in the predetermined amount respectively.

As described above, according to the present embodiment, the effect of improving battery lifetime in a secondary battery can be obtained. This makes it possible to provide a lithium secondary battery with a long life.

REFERENCE SIGNS LIST

1 positive electrode active material layer
2 negative electrode active material layer
3 positive electrode current collector
4 negative electrode current collector
5 separator
6 laminate package
7 laminate package
8 negative electrode tab
9 positive electrode tab
10 film package
20 battery element
25 separator
30 positive electrode
40 negative electrode

The invention claimed is:
1. A secondary battery comprising a negative electrode and an electrolyte solution,
wherein the negative electrode comprises a negative electrode active material comprising a silicon-containing compound,
wherein the electrolyte solution comprises:
at least one selected from fluorine-containing ether compounds represented by the following formula (1),
at least one selected from fluorine-containing phosphoric acid ester compounds represented by the following formula (2),
at least one selected from sulfone compounds represented by the following formula (3), and
at least one selected from cyclic carbonate compounds, wherein
a content of the fluorine-containing ether compound represented by the formula (1) in the electrolyte solution is 10 vol % or more and 80 vol % or less, a content of the fluorine-containing phosphoric acid ester compound represented by the formula (2) in the electrolyte solution is 1 vol % or more and 50 vol % or less,
a content of the sulfone compound represented by the formula (3) in the electrolyte solution is 1 vol % or more and 50 vol % or less, and
a content of the cyclic carbonate compound in the electrolyte solution is 1 vol % or more and 40 vol % or less;

$$R_1-O-R_2 \quad (1)$$

{In formula (1), $R_1$ and $R_2$ are each independently an alkyl group or a fluorine-containing alkyl group, and at least one of $R_1$ and $R_2$ is a fluorine-containing alkyl group};

$$O=P(-O-R_1')(-O-R_2')(-O-R_3') \quad (2)$$

{In formula (2), $R_1'$, $R_2'$ and $R_3'$ are each independently an alkyl group or a fluorine-containing alkyl group, and at least one of $R_1'$, $R_2'$ and $R_3'$ is a fluorine-containing alkyl group};

$$R_1''-SO_2-R_2'' \quad (3)$$

{In formula (3), $R_1''$ and $R_2''$ are each independently a substituted or unsubstituted alkyl group or alkylene group, and carbon atoms in $R_1''$ and $R_2''$ may be bonded through a single bond or a double bond to form a cyclic compound}; and
wherein the fluorine-containing ether compound represented by the formula (1) comprises at least one selected from the group consisting of 1,1,2,2-tetrafluoroethyl 2,2,3,3-tetrafluoropropyl ether, 2,2,3,4,4,4-hexafluorobutyl difluoromethyl ether, 1,1-difluoroethyl 2,2,3,3-tetrafluoropropyl ether, 1,1,2,3,3,3-hexafluoropropyl 2,2-difluoroethyl ether, 1,1-difluoroethyl 1H,1H-heptafluorobutyl ether, 1H, 1H, 2'H, 3H-decafluorodipropyl ether, bis(2,2,3,3,3-pentafluoropropyl)ether, 1H, 1H, 5H-perfluoropentyl 1,1,2,2-tetrafluoroethyl ether, bis(1H, 1H-heptafluorobutyl)ether, 1H, 1H, 2'H-perfluorodipropyl ether, 1,1,2,3,3,3-hexafluoropropyl 1H, 1H-heptafluorobutyl ether, 1H-perfluorobutyl 1H-perfluoroethyl ether and bis(2,2,3,3-tetrafluoropropyl)ether;
further wherein the sulfone compound represented by the formula (3) comprises at least one selected from the group consisting of sulfolane, 3-methylsulfolane, dimethyl sulfone, ethyl methyl sulfone, diethyl sulfone and ethyl isopropyl sulfone.

2. The secondary battery according to claim 1, wherein the silicon-containing compound is at least one selected from the group consisting of:
a Si oxide represented by $SiO_x$ ($0<x\leq2$),
a silicon alloy represented by $M1_ySi_{1-y}$ (M1 is a metal element and comprises at least one selected from the group consisting of Li, B, Mg, Na, Al, K, Ca, Ti, V, Cr, Mn, Fe, Co, Ni, Cu, and Zn, and $0<y<1$),
a silicon composite oxide represented by $M2_zSi_{1-z}O_w$ (M2 is a metal element and comprises at least one selected from the group consisting of Li, B, Mg, Na, Al, K, Ca, Ti, V, Cr, Mn, Fe, Co, Ni, Cu and Zn, and $0<z<1$, $0<w<2$),
an elemental Si, and
a silicon nitride.

3. The secondary battery according to claim 1, wherein a content of the fluorine-containing ether compound represented by the formula (1) in the electrolyte solution is 20 vol % or more and 75 vol % or less.

4. The secondary battery according to claim 1, wherein the total number of carbon atoms in the fluorine-containing ether compound represented by the formula (1) is 4 or more and 10 or less.

5. The secondary battery according to claim 1, wherein a ratio of the number of fluorine atoms based on the total number of hydrogen atoms and fluorine atoms in the fluorine-containing ether compound represented by the formula (1) is 40% or more and 90% or less.

6. The secondary battery according to claim 1, wherein the electrolyte solution comprises two or more types of the fluorine-containing ether compounds represented by the formula (1), which are selected from the group consisting of 1,1,2,2-tetrafluoroethyl 2,2,3,3-tetrafluoropropyl ether, 2,2,3,4,4,4-hexafluorobutyl difluoromethyl ether, 1,1-difluoroethyl 2,2,3,3-tetrafluoropropyl ether, 1,1,2,3,3,3-hexafluoropropyl 2,2-difluoroethyl ether, 1,1-difluoroethyl 1H, 1H-heptafluorobutyl ether, 1H, 1H, 2'H, 3H-decafluorodipropyl ether, bis(2,2,3,3,3-pentafluoropropyl)ether, 1H, 1H, 5H-perfluoropentyl 1,1,2,2-tetrafluoroethyl ether, bis(1H, 1H-heptafluorobutyl)ether, 1H, 1H, 2'H-perfluorodipropyl ether, 1,1,2,3,3,3-hexafluoropropyl 1H, 1H-heptafluorobutyl ether, 1H-perfluorobutyl 1H-perfluoroethyl ether and bis(2,2,3,3-tetrafluoropropyl)ether.

7. The secondary battery according to claim 1, wherein a content of the fluorine-containing phosphoric acid ester compound represented by the formula (2) is 5 vol % or more and 40 vol % or less.

8. The secondary battery according to claim 1, wherein the total number of carbon atoms in the fluorine-containing phosphoric acid ester compound represented by the formula (2) is 4 or more and 10 or less.

9. The secondary battery according to claim 1, wherein the fluorine-containing phosphoric acid ester compound represented by the formula (2) comprises at least one selected from the group consisting of tris(2,2,2-trifluoroethyl)phosphate, (2,2,3,3,3-pentafluoropropyl)phosphate and tris(1H, 1H-heptafluorobutyl)phosphate.

10. The secondary battery according to claim 1, wherein a content of the sulfone compound represented by the formula (3) in the electrolyte solution is 2 vol % or more and 40 vol % or less.

11. The secondary battery according to claim 1, wherein the sulfone compound represented by the formula (3) is a mixture of a cyclic sulfone and an open-chain sulfone.

12. The secondary battery according to claim 11, wherein a volume ratio of the open-chain sulfone based on the total of the volume of the cyclic sulfone and the volume of the open-chain sulfone is 10% or more and 90% or less.

13. The secondary battery according to claim 1, wherein a content of the cyclic carbonate compound in the electrolyte solution is 2 vol % or more and 30 vol % or less.

14. The secondary battery according to claim 1, wherein the cyclic carbonate compound comprises at least one selected from the group consisting of ethylene carbonate, propylene carbonate and fluorinated ethylene carbonate.

15. The secondary battery according to claim 1, wherein the cyclic carbonate compound comprises:
propylene carbonate and
at least one selected from the group consisting of ethylene carbonate and fluorinated ethylene carbonate.

16. The secondary battery according to claim 1, wherein the cyclic carbonate compound comprises propylene carbonate, and a content of the propylene carbonate in the total of the cyclic carbonate compound is 20 vol % or more and 80 vol % or less.

17. A method of producing a secondary battery comprising an electrode element, an electrolyte solution and an outer package, comprising:
   a step of preparing a negative electrode comprising a negative electrode active material comprising a silicon-containing compound;
   a step of preparing an electrode element by placing a positive electrode and the negative electrode so as to face each other; and
   a step of encapsulating the electrode element and the aqueous electrolyte solution in the outer package,
   wherein the electrolyte solution comprises:
      at least one selected from fluorine-containing ether compounds represented by the following formula (1),
      at least one selected from fluorine-containing phosphoric acid ester compounds represented by the following formula (2),
      at least one selected from sulfone compounds represented by the following formula (3), and
      at least one selected from cyclic carbonate compounds, wherein
      a content of the fluorine-containing ether compound represented by the formula (1) in the electrolyte solution is 10 vol % or more and 80 vol % or less,
      a content of the fluorine-containing phosphoric acid ester compound represented by the formula (2) in the electrolyte solution is 1 vol % or more and 50 vol % or less,
      a content of the sulfone compound represented by the formula (3) in the electrolyte solution is 1 vol % or more and 50 vol % or less, and
      a content of the cyclic carbonate compound in the electrolyte solution is 1 vol % or more and 40 vol % or less;

$$R_1-O-R_2 \tag{1}$$

{In formula (1), $R_1$ and $R_2$ are each independently an alkyl group or a fluorine-containing alkyl group, and at least one of $R_1$ and $R_2$ is a fluorine-containing alkyl group};

$$O=P(-O-R_1')(-O-R_2')(-O-R_3') \tag{2}$$

{In formula (2), $R_1'$, $R_2'$ and $R_3'$ are each independently an alkyl group or a fluorine-containing alkyl group, and at least one of $R_1'$, $R_2'$ and $R_3'$ is a fluorine-containing alkyl group};

$$R_1''-SO_2-R_2'' \tag{3}$$

{In formula (3), $R_1''$ and $R_2''$ are each independently a substituted or unsubstituted alkyl group or alkylene group, and carbon atoms in $R_1''$ and $R_2''$ may be bonded through a single bond or a double bond to form a cyclic compound}; and wherein the fluorine-containing ether compound represented by the formula (1) comprises at least one selected from the group consisting of 1,1,2,2-tetrafluoroethyl 2,2,3,3-tetrafluoropropyl ether, 2,2,3,4,4,4-hexafluorobutyl difluoromethyl ether, 1,1-difluoroethyl 2,2,3,3-tetrafluoropropyl ether, 1,1,2,3,3,3-hexafluoropropyl 2,2-difluoroethyl ether, 1,1-difluoroethyl 1H,1H-heptafluorobutyl ether, 1H, 1H, 2'H, 3H-decafluorodipropyl ether, bis(2,2,3,3,3-pentafluoropropyl)ether, 1H, 1H, 5H-perfluoropentyl 1,1,2,2-tetrafluoroethyl ether, bis(1H, 1H-heptafluorobutyl)ether, 1H, 1H, 2'H-perfluorodipropylether, 1,1,2,3,3,3-hexafluoropropyl 1H, 1H-heptafluorobutyl ether, 1H-perfluorobutyl 1H-perfluoroethyl ether and bis(2,2,3,3-tetrafluoropropyl)ether;

further wherein the sulfone compound represented by the formula (3) comprises at least one selected from the group consisting of sulfolane, 3-methylsulfolane, dimethyl sulfone, ethyl methyl sulfone, diethyl sulfone and ethyl isopropyl sulfone.

18. The secondary battery according to claim 1, wherein a content of the fluorine-containing ether compound represented by the formula (1) in the electrolyte solution is 35 vol % or more and 75 vol % or less.

* * * * *